Figure 1:
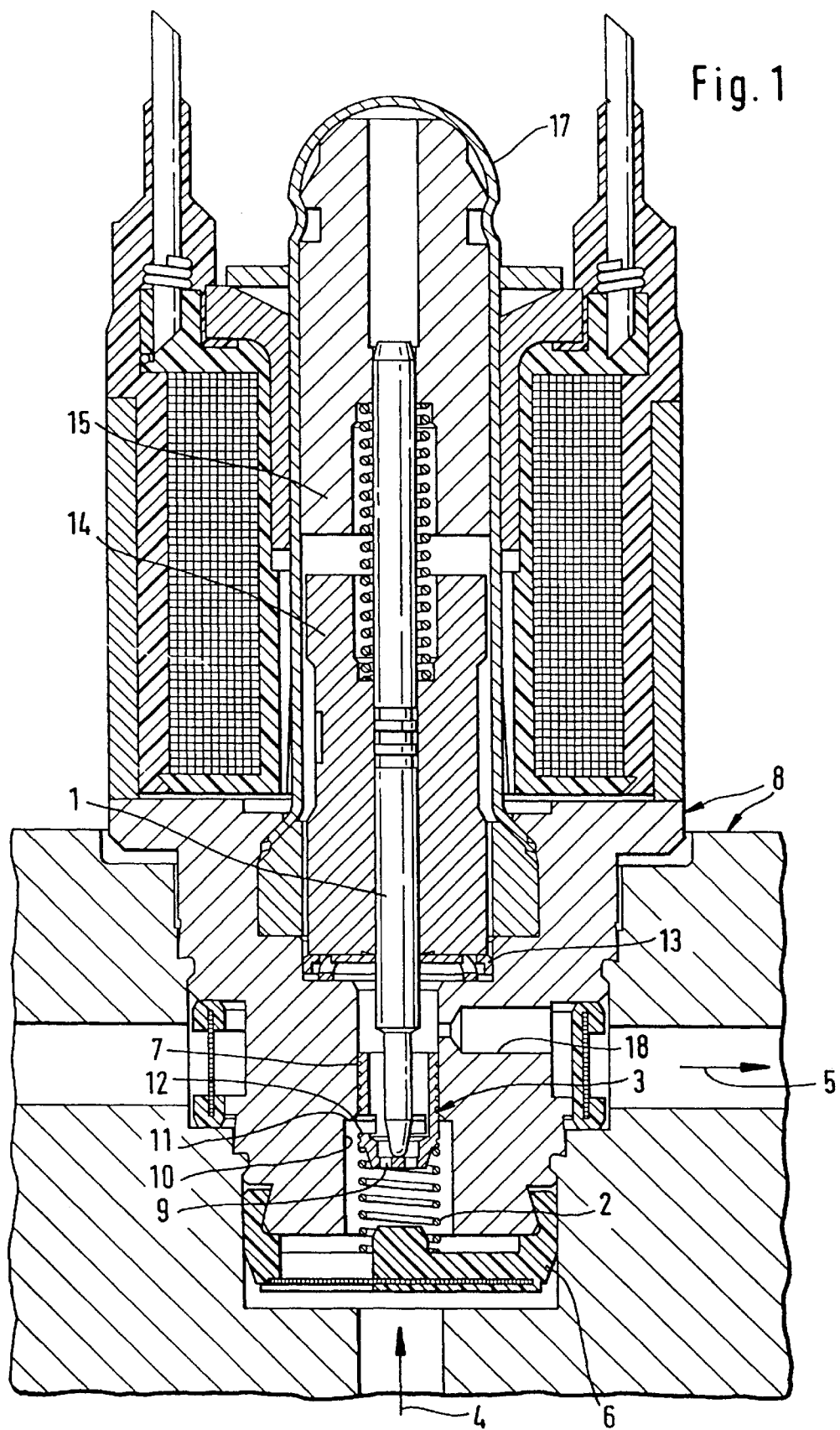

United States Patent
Zaviska et al.

[11] Patent Number: 5,975,654
[45] Date of Patent: Nov. 2, 1999

[54] VALVE UNIT, IN PARTICULAR FOR HYDRAULIC BRAKE SYSTEMS WITH ANTILOCK AND/OR WHEEL-SLIP CONTROL

[75] Inventors: Dalibor Zaviska, Eschborn/Ts.; Paul Linhoff, Eppertshausen, both of Germany

[73] Assignee: ITT Manufacturing Enterprises Inc., Wilmington, Del.

[21] Appl. No.: 08/776,993

[22] PCT Filed: Jul. 26, 1995

[86] PCT No.: PCT/EP95/02946

§ 371 Date: Apr. 28, 1997

§ 102(e) Date: Apr. 28, 1997

[87] PCT Pub. No.: WO96/05090

PCT Pub. Date: Feb. 22, 1996

[30] Foreign Application Priority Data

Aug. 6, 1994 [DE] Germany ............... 44 27 905

[51] Int. Cl.[6] ................................. B60T 8/36
[52] U.S. Cl. .................... 303/119.2; 251/129.02; 251/117; 137/599.2
[58] Field of Search ............. 303/119.2, 119.1; 137/599.2; 251/129.02, 117

[56] References Cited

U.S. PATENT DOCUMENTS

| | | | |
|---|---|---|---|
| 5,076,588 | 12/1991 | Mohr et al. | 303/119.2 X |
| 5,356,211 | 10/1994 | Fritsch | 303/119.2 |
| 5,673,980 | 10/1997 | Schwarz et al. | 303/119.2 |

FOREIGN PATENT DOCUMENTS

| | | |
|---|---|---|
| 0065451 | 11/1982 | European Pat. Off. . |
| 0334029 | 9/1989 | European Pat. Off. . |
| 0353635 | 2/1990 | European Pat. Off. . |
| 0423755 | 4/1991 | European Pat. Off. . |
| 0434092 | 6/1991 | European Pat. Off. . |
| 0452173 | 10/1991 | European Pat. Off. . |
| 3934771 | 2/1991 | Germany . |
| 4112920 | 4/1991 | Germany . |
| 4013425 | 6/1991 | Germany . |
| 4234749 | 10/1992 | Germany . |
| 4237681 | 5/1993 | Germany . |
| 4236482 | 5/1994 | Germany . |
| 4312414 | 10/1994 | Germany . |
| WO9118774 | 12/1991 | WIPO . |
| WO9218362 | 10/1992 | WIPO . |
| WO9605090 | 2/1996 | WIPO . |

*Primary Examiner*—Robert J. Oberleitner
*Assistant Examiner*—Thomas J. Williams
*Attorney, Agent, or Firm*—Rader, Fishman & Grauer PLLC

[57] ABSTRACT

The invention pertains to a valve unit, comprising a valve housing (8) with a flow control valve, an electromagnetic actuating element (1) that is structurally arranged in series with the flow control valve in the valve housing (8), and a piston (3) that forms the flow control valve and produces an unobstructed pressure medium connection between a pressure medium source (4) and a pressure medium sink (5) in its normal position. In its normal position, the actuating element (1) is supported on one end face of the piston (3) against the force of a compression spring (2). In the operating position, the actuating element separates from the piston (3) and assumes an intermediate position in which it controls the volume flow of the pressure medium between the pressure medium source (4) and the pressure medium sink (5). This results in a simple and reliable valve construction.

9 Claims, 6 Drawing Sheets

VALVE UNIT, IN PARTICULAR FOR HYDRAULIC BRAKE SYSTEMS WITH ANTILOCK AND/OR WHEEL-SLIP CONTROL

The invention pertains to a valve unit, in particular, for hydraulic brake systems with antilock and/or wheel-slip control.

A valve unit of the type constituting this class is known from EP 0,353,635 B1.

This valve unit comprises a housing, into which a piston that functions as a flow control valve is inserted. This flow control valve regulates the volume flow between a pressure medium source and a pressure medium sink as a function of the switching position of an electromagnetic actuating element. In order to fulfill this function, the piston has a relatively long shaft, the through-holes of which are provided with control edges that override the pressure medium channels of the pressure medium sink or the pressure medium source which open radially into the valve housing. Not only the relatively large size of the flow control valve, but also the activation of the flow controller by letting off the pressure medium after opening the electromagnetically controlled pressure medium connection to a reservoir result in a substantial structural volume of the valve unit.

Consequently, the present invention is based on the objective of improving a valve unit of the initially mentioned type in such a way that a functionally reliable operation is ensured and the structural volume is reduced to a minimum with simple means.

The invention proposes to support an electromagnetic actuating element on one end face of the flow control valve against the force of a compression spring in its normal position, and that the piston of the flow control valve separates from the actuating element in the operating position of the actuating element and assumes an intermediate position in which it controls the volume flow of the pressure medium between the pressure medium source and the pressure medium sink.

The invention proposes to arrange the piston of the flow control valve between the actuating element and the compression spring that is supported on a holding part of the valve unit. Due to this measure, the graduated bore required for the flow control valve can have relatively short dimensions and it is ensured that the piston of the flow control valve is directly contacted by the actuating element.

The further elaboration of the invention provides that the piston is guided in the valve housing in axially movable fashion while it is metallically sealed by means of several annular grooves arranged on its circumference, such that the annular grooves fulfill the function of labyrinth seals. This means that only negligible small leakage flows are formed along the outer contour of the piston and the length of the piston can be significantly reduced.

In order to ensure a favorable arrangement of the metering orifice required for the flow control valve, it is proposed to integrate the metering orifice within the region of the end face that is contacted by the actuating element.

A realization of the control edge function between the flow control valve and the valve housing required for regulating the pressure which is particularly favorable for manufacturing reasons is disclosed. The valve housing comprises a graduated bore that provides advantages with respect to the pressure control as well as the arrangement of the actuating element and the compression spring.

With regard to the aforementioned advantage of a favorable pressure medium flow, it is proposed that the piston comprise at least one control edge at the elevation of the bore graduation so as to ensure an unobstructed pressure medium flow between the pressure medium source and the pressure medium sink in the normal position of the actuating element.

Due to the design of the piston in the shape of a pot, it is possible either to insert the actuating element as deep as possible into the flow control valve or, alternatively, support the compression spring therein, i.e., the characteristics result in a drastic reduction of the structural length.

A practical measure for adjusting the actuating element in the graduated bore is disclosed. For this purpose, a spacer is inserted into the graduated bore.

The characteristics result in advantages with respect to the function as well as the manufacture of the valve unit. These advantages are described in detail below with reference to different embodiments of the invention.

Additional objectives, characteristics, advantages and application possibilities of the present invention can be derived from the following description of several embodiments, wherein all described and/or graphically illustrated characteristics can form the object of the invention individually or as an arbitrary, practical combination, independently of their combination in the claims or their reference to other claims.

Figure 2:
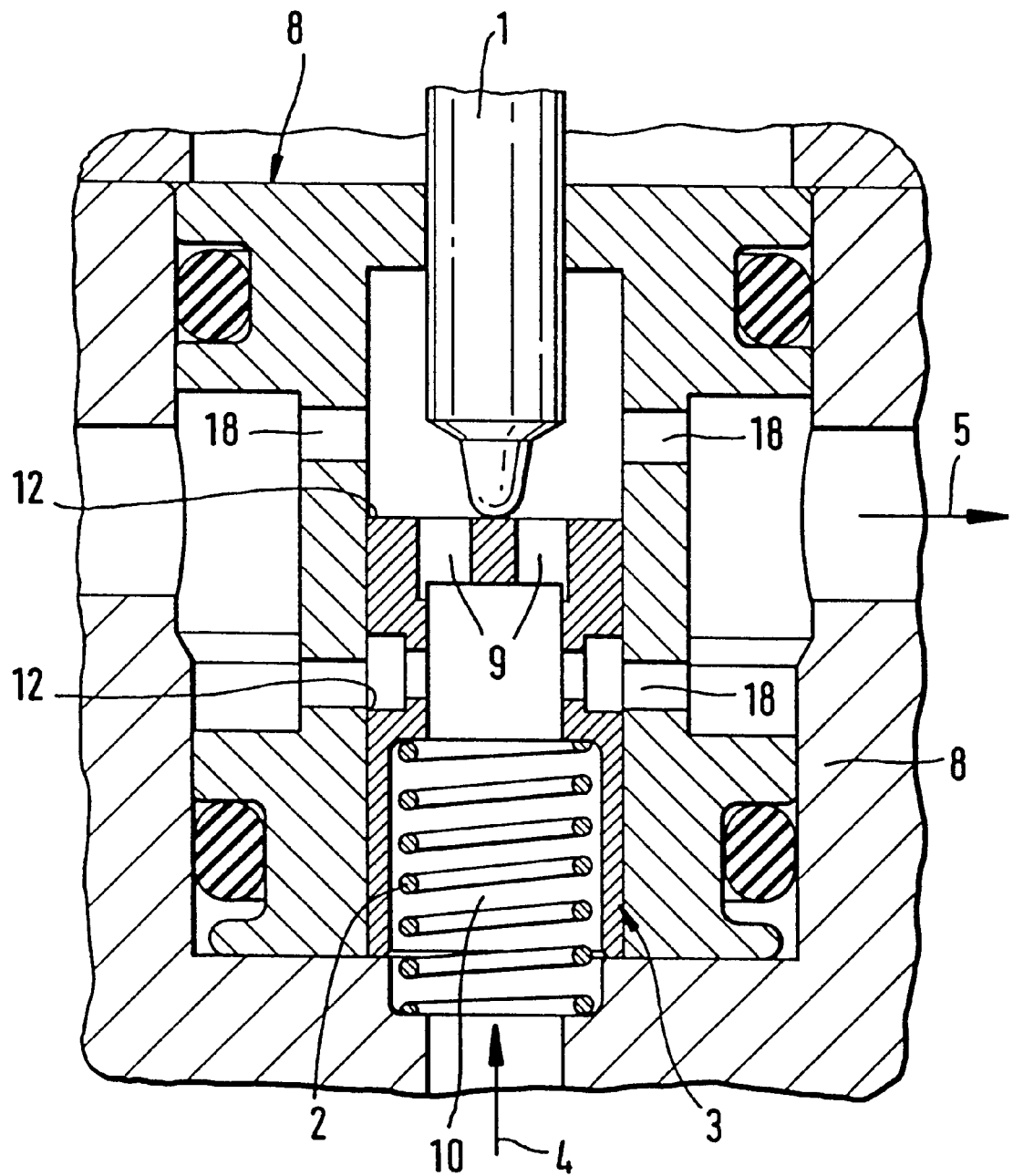
Figure 3:
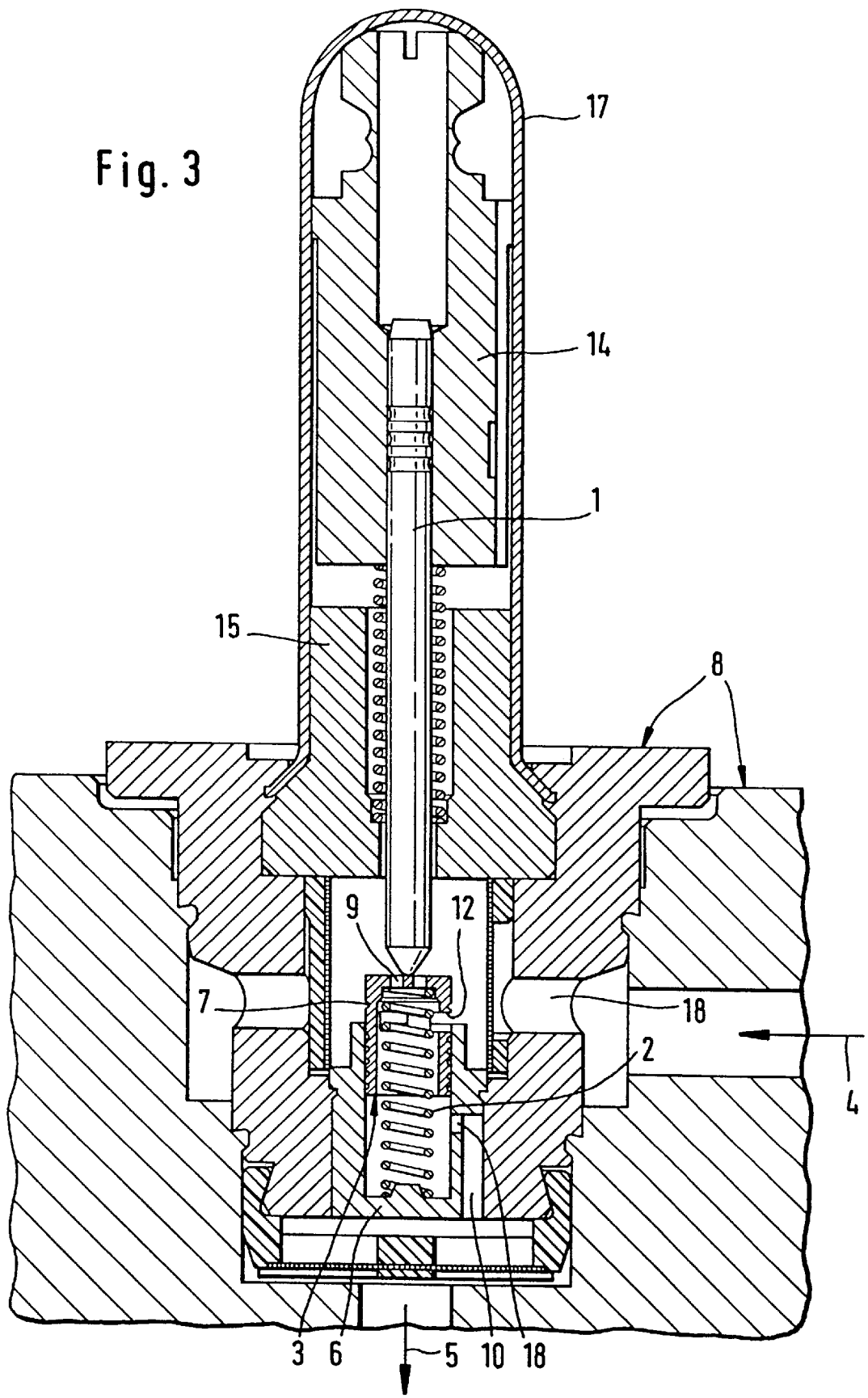
Figure 4:
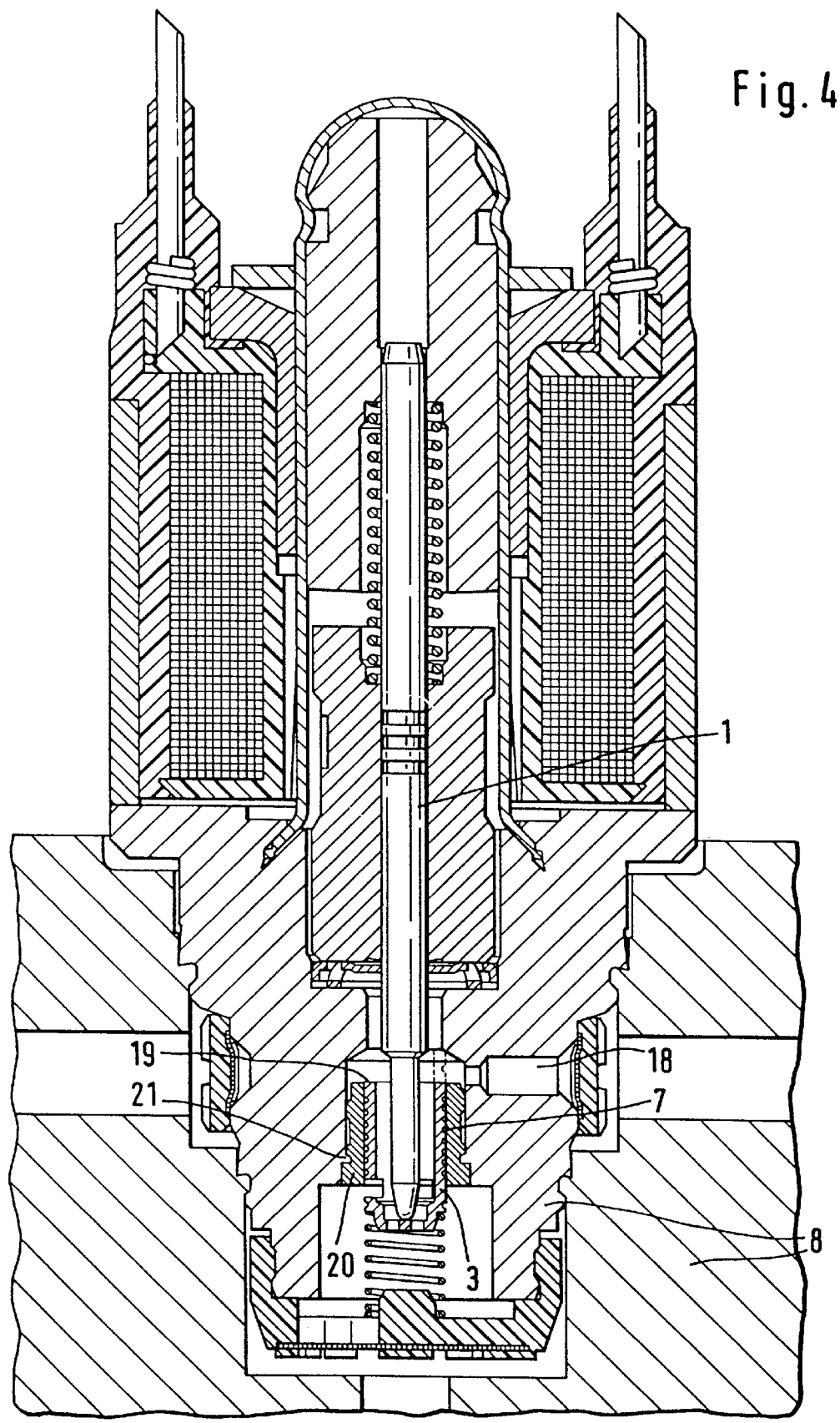

The figures show:

FIG. 1, a cross section through a first embodiment of a valve unit;

FIG. 2, an enlarged detail of one additional embodiment of the object of the invention;

FIG. 3, a structurally reversed arrangement and actuation of the valve unit according to the invention, wherein the connections of the pressure medium source and the pressure medium sink are reversed in comparison to the previous figures;

FIG. 4, a modification of the valve unit shown in FIG. 1, and

Figure 5:
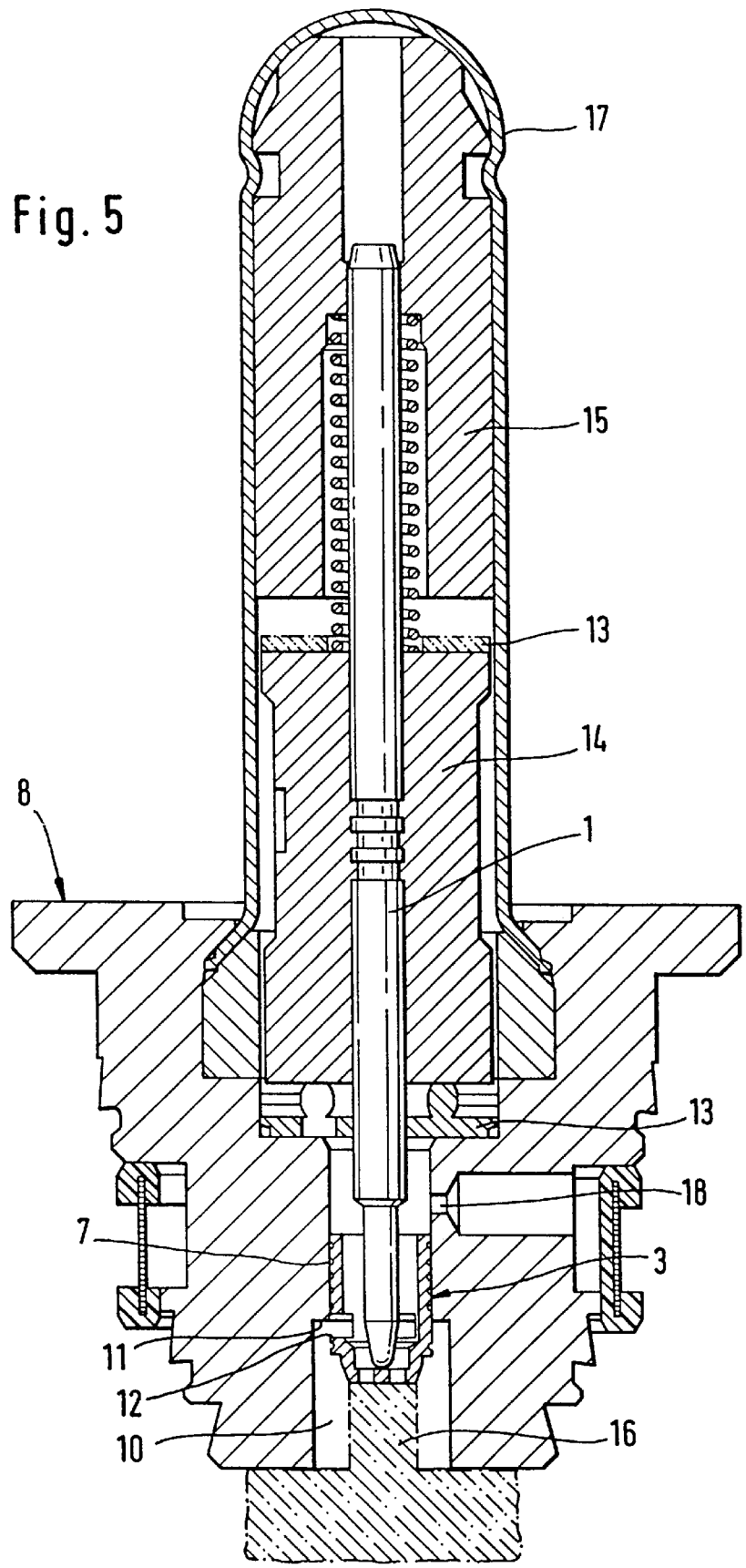
Figure 6:
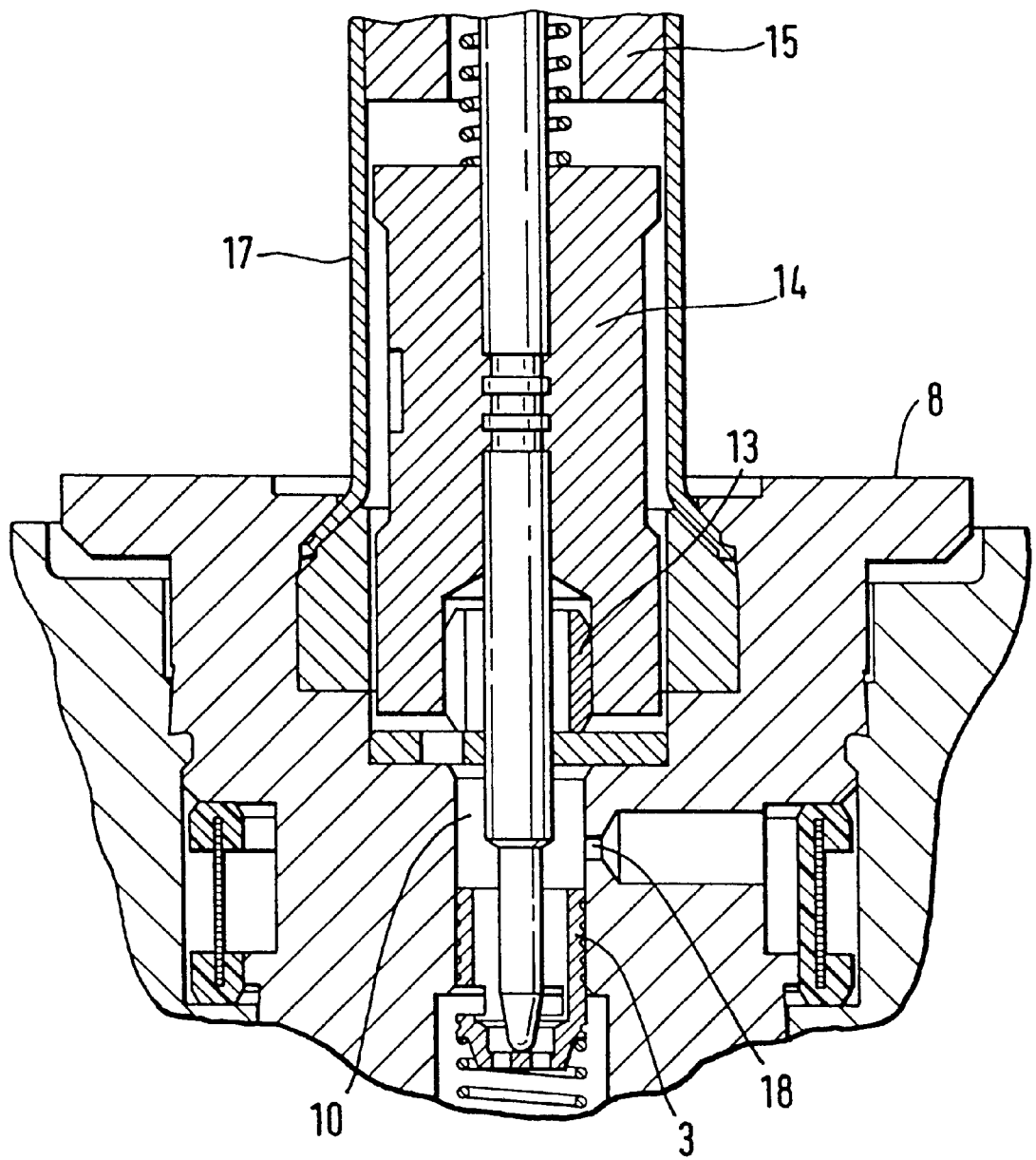

FIGS. 5 and 6, details of the adjustment of the valve unit.

FIG. 1 shows a cross section through a valve unit with an actuating element 1 that forms part of an armature 14 and a magnet core 15 that is arranged above the armature 14 and enclosed by a sleeve 17, which is held in its lower part in the valve housing 8 by means of caulking. In addition, a piston 3 that acts as a flow control valve as well as a compression spring 2 that is supported on the piston 3 and adjoins a holding part 6 with the spring end that faces away from the piston 3 are situated within the lower region of the valve housing. The actuating element 1 extends up to the inner end face of the piston 3 which has the shape of a pot. The actuating element 1 and the piston 3 are aligned coaxially in a graduated bore 10, with the bore graduation 11 forming a free pressure medium passage between the pressure medium source 4 and the pressure medium sink 5 if the actuating element 1, namely the end face of the armature 14, contacts a spacer 13 situated in the graduated bore 10 under the influence of a compression spring that is arranged between the armature 14 and the magnet core 15 as shown in the figure. For this purpose, the piston 3 of the flow control valve comprises an opening that radially penetrates the piston wall, with the control edge 12 of said opening releasing the cross section required for the unobstructed pressure medium flow. Metering orifices 9, through which the pressure medium simultaneously flows, are situated in the end face of the piston 3 underneath the control edge 12. The second end face (annular surface), situated opposite the contact surface between the actuating element 1 and the piston 3, also fulfills the function of a control edge which, depending on the operating state, covers the transverse channel 18 in the valve housing 8 which is connected to the pressure medium sink 5 if the armature 14 is electromagnetically excited. This figure shows that a plate filter element serves as the holding part 6 for the compression spring 2. However, the holding part 6 can, if so desired or required, be positively and/or non-positively fastened within the end face region of the valve housing 8 separately of the plate filter element. The valve housing 8 is divided into two sections, wherein the outer section of the valve housing 8 forms part of a valve block and the inner section of the valve housing 8 is realized in the form of a valve cartridge that is held in the block-shaped housing by means of caulking. A coil for realizing the electromagnetic excitation is situated on the protruding outer end face of the valve cartridge.

The function of this valve unit in an antilock brake system is described below.

In the normal position of the armature 14 shown in the figure, the compression spring arranged between the magnet core 15 and the armature 14 presses the actuating element 1 against the piston 3 such that an unobstructed passage between the pressure medium source (main brake cylinder) and the pressure medium sink 5 (wheel brake) is produced via the open cross sections on the piston 3 and the freed-up transverse channel 18 above the piston 3. Depending on the force of the compression spring 2 arranged above the armature 14, this compression spring has such dimensions that the piston 3 does not close the transverse channel 18 that leads to the pressure medium sink 5 if the pressure of the pressure medium source 4 increases (actuation of the main brake cylinder). Once the armature 14 is electromagnetically excited, the actuating element 1 is moved in the direction toward the magnet core 15 such that the piston 3 moves upward due to the force of the compression spring 2 and covers the transverse channel 18 that leads to the pressure medium sink 5 with its outer surface. The control edge 12 of the piston 3 is simultaneously situated congruently with the bore graduation 11 such that the pressure medium can reach the interior of the piston 3 only via the metering orifice 9. This means that the flow control valve is situated in the closed position. The flow control valve is opened by interrupting the excitation of the armature 14 such that the compression spring arranged between the armature 14 and the magnet core 15 moves the piston 3 downward, i.e., the transverse channel 18 is released in order to control the volume flow. The fluid that now flows from the pressure medium source 4 can reach the transverse channel 18 and consequently the pressure medium sink 5 only via the metering orifice 9. Consequently, the piston 3 moves into a position in which it controls the volume flow and the control edge 12 covers the bore graduation 11. This means that the piston 3 is situated in a position in which the resultant spring force of both compression springs is, depending on the cross-sectional surface of the piston, in an equilibrium with the differential pressure adjusted on the metering orifice 9. In the present embodiment for an antilock brake system, the previously described flow control function is effective if the hydraulic pressure exceeds approximately 5 bar. This flow control function provides the advantage that a constant pressure build-up gradient is attained independently of the differential pressure between the pressure medium source 4 and the pressure medium sink 5. This constant pressure build-up gradient does not depend on the respective admission pressure of the pressure medium source 4 above, the response pressure of the flow control valve. Due to the path-dependent control of the pressure medium volume by means of the piston 3, pressure shocks during a change in pressure in the pressure build-up phase, the pressure drop phase and the constant pressure phase of an antilock brake system are very small. The cross sections of the passage between the pressure medium source 4 and the pressure medium sink 5 can have such dimensions that the desired maximum pressure build-up gradient is attained if the actuating element 1 is not electromagnetically excited, and that smaller pressure gradients can be adjusted by electromagnetically pulsing the actuating element 1.

The ensuing FIGS. 2–6 show variations of the previously described embodiment according to FIG. 1, wherein the following explanations only pertain to modifications of FIGS. 2–6 in comparison to FIG. 1.

FIG. 2 shows an enlarged detail of a valve unit that is designed to be similar to that shown in FIG. 1. However, the pressure medium connection between the pressure medium source 4 and the pressure medium sink 5 is realized in the form of two parallel transverse channels 18 in the valve housing 8, i.e., a lower flow resistance is attained in the normal position of the valve unit. In contrast to FIG. 1, the actuating element 1 adjoins the outer side of the end face of the piston 3, with the compression spring 2 extending into the interior of the piston 3 and being supported therein by the proposed pot-shaped design of the piston. This means that in contrast to FIG. 1, the piston 3 is arranged in the graduated bore in the opposite direction. The end face of the piston 3 which faces the actuating element 1 as well as bores that transversely extend in the piston shaft form the control edges 12.

In contrast to FIG. 1, FIG. 3 shows a valve housing 8 in which the flow direction is reversed, i.e., the piston 3 is also inserted into the valve housing 8 in the opposite direction in order to fulfill the flow control function. With respect to the design details of the piston 3, we refer to FIG. 1. In this case, the compression spring 2 is supported inside of the pot-shaped piston 3 and adjoins a holding part 6 with its other end. This holding part is preferably fastened in the valve housing 8 by means of a self-caulking point. The actuating element 1 consequently contacts the outer end faces of the piston 3. The magnet core 15 forms part of housing 8 and the armature 14 is guided outside of housing 8 in the sleeve 17. A compression spring arranged between the magnet core 15 and the armature 14 ensures an unobstructed pressure medium passage between the pressure medium source 4 and the pressure medium sink 5 in the electromagnetically nonexcited position of the actuating element 1. If the magnet armature 14 is electromagnetically excited, the piston 3 blocks the hydraulic connection between the pressure medium source 4 and the pressure medium sink 5, with the volume flow control of the piston 3 in the direction of the pressure medium sink 5 being accomplished via the metering orifice 9 in the piston 3 and the transverse channel 18 in the holding part 6, namely independently of the compression spring arranged between the magnet core 15 and the armature 14.

In contrast to FIG. 1, FIG. 4 shows a graduated bore 10 that is realized in conically tapered fashion within the region situated above the pot-shaped piston 3. If the armature 14 is electromagnetically excited, the edge of the piston 3 comes into contact with the conical taper of the graduated bore 10 and serves as a sealing surface 19, i.e., a sealing effect between the pressure chamber situated underneath the piston 3 and the transverse channel 18 is realized with the aid of the annular grooves 7 that act as labyrinth seals, with the pressure chamber situated above the piston 3 reliably sealed relative to the transverse channel 18. The piston 3 is guided in a bushing 20 that is offset at the elevation of the transverse channel 18 and fastened in the valve housing 8 by means of caulking element 21. FIG. 4 shows the piston 3 in the deactivated position of the actuating element 1 as well as in the electromagnetically excited operating position (indicated by broken lines) in which the piston 3 contacts the conical taper of the graduated bore 10 with its sealing surface 19.

FIG. 5 shows details necessary for the adjustment of the valve unit. According to this Figure, a spacer 13 is initially placed between the armature 14 and the magnet core 15 in order to adjust the actuating stroke. After attaching the sleeve 17, this spacer is forcefully pressed into the valve housing 8 until the disk-shaped spacer 13 that was inserted between the armature 14 and the valve housing 8 is deformed to the desired degree. The actuating element 1 is simultaneously moved into the desired position by means of an adjusting tool 16 that is inserted into the graduated bore 10 of the valve housing 8 from the bottom. Subsequently, the spacer 13 situated between the armature 14 and the magnet core 15 is removed and, after attaching the sleeve 17 to the previously described parts, the sleeve is caulked in the valve housing 8.

In contrast to FIG. 5, FIG. 6 shows the stroke adjustment of the actuating element 1 by means of a spacer 13 that is realized in the form of a clamping sleeve and arranged in the armature 14 in frictionally engaged fashion. This clamping sleeve is supported in the graduated bore 10 on the opposite side of the valve housing 8.

Certain variations of the adjusting aids described previously with reference to FIGS. 5 and 6 are possible. These variations pertain to the design of the spacer 13 and the adjusting tool 16, but also fall into the scope of the invention with respect to the basic arrangement and measures for adjusting the actuating element 1 or the piston 3. Consequently, additional embodiments are conceivable, but a graphic illustration of these additional embodiments is not absolutely imperative.

List of reference numerals
1 Actuating element
2 Compression spring
3 Piston
4 Pressure medium source
5 Pressure medium sink
6 Holding part
7 Annular groove
8 Valve housing
9 Metering orifice
10 Graduated bore
11 Bore graduation
12 Control edge
13 Spacer
14 Armature
15 Magnet core
16 Adjusting tool
17 Sleeve
18 Transverse channel
19 Sealing surface
20 Bushing

We claim:

1. Valve unit for hydraulic brake systems with antilock and/or wheel-slip control, comprising a valve housing with a flow control valve, an electromagnetically actuated element that is structurally arranged in series with the flow control valve in the valve housing, and a piston that forms the flow control valve wherein the actuated element engages an end face of the piston against the force of a compression spring to produce an unobstructed passage for connecting a pressure medium source and a pressure medium sink in a normal deactivated position, and that the piston is able to separate from the actuated element and assume an intermediate position that controls the volume flow of the pressure medium for a connection between a pressure medium source and a pressure medium sink in an activated operating position of the actuated element wherein the end face that is contacted by the actuated element is provided with at least one metering orifice.

2. Valve unit according to claim 1, wherein the piston is arranged between the actuated element and the compression spring that is supported on a holding part in the valve housing.

3. Valve unit according to claim 1, wherein the piston is guided in the valve housing in axially movable fashion while being metallically sealed by means of several annular grooves arranged on its circumference.

4. Valve unit according to claim 1, wherein the valve housing comprises a graduated bore for accommodating the actuated element, the piston and the compression spring.

5. Valve unit according to claim 1, wherein the piston comprises at least one control edge at the elevation of a bore graduation.

6. Valve unit according to claim 1, wherein the piston face is essentially constructed in pot-shaped fashion, and that the compression spring and the actuated element are supported on the piston face.

7. Valve unit according to claim 4, wherein the graduated bore accommodates a spacer for adjusting the actuated element.

8. Valve unit according to claim 1, wherein the actuated element, the piston, and the compression spring are aligned coaxially.

9. Valve unit according to claim 1, wherein the piston comprises a sealing surface within the region of its end face, and that the sealing surface can be placed against the valve housing for interrupting the pressure medium connection between a pressure medium source and a pressure medium sink.

* * * * *